US011150466B2

(12) United States Patent
Saito et al.

(10) Patent No.: US 11,150,466 B2
(45) Date of Patent: Oct. 19, 2021

(54) OPTICAL SYSTEM AND IMAGING APPARATUS INCLUDING THE SAME

(71) Applicant: CANON KABUSHIKI KAISHA, Tokyo (JP)

(72) Inventors: Shinichiro Saito, Utsunomiya (JP); Makoto Nakahara, Utsunomiya (JP); Suguru Inoue, Utsunomiya (JP); Akira Mizuma, Utsunomiya (JP); Masakazu Yamagishi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 135 days.

(21) Appl. No.: 16/192,646

(22) Filed: Nov. 15, 2018

(65) Prior Publication Data

US 2019/0162932 A1 May 30, 2019

(30) Foreign Application Priority Data

Nov. 30, 2017 (JP) .............................. JP2017-230831

(51) Int. Cl.
*G02B 27/00* (2006.01)
(52) U.S. Cl.
CPC ................. *G02B 27/0025* (2013.01)
(58) Field of Classification Search
CPC ........ G02B 27/0025; G02B 15/144111; G02B 9/12

USPC .......................................... 359/784, 745–748
See application file for complete search history.

(56) References Cited

U.S. PATENT DOCUMENTS

| 2013/0021513 A1* | 1/2013 | Eguchi | ..................... | G02B 9/12 348/335 |
| 2013/0100337 A1* | 4/2013 | Eguchi | ................... | G02B 13/02 348/345 |
| 2018/0031811 A1* | 2/2018 | Miwa | ....................... | G02B 7/04 |

FOREIGN PATENT DOCUMENTS

JP 2016-161643 A 9/2016

* cited by examiner

*Primary Examiner* — Marin Pichler
*Assistant Examiner* — Mitchell T Oestreich
(74) *Attorney, Agent, or Firm* — Canon U.S.A., Inc. IP Division

(57) ABSTRACT

An optical system includes a first lens unit having positive refractive power, a second lens unit, and a third lens unit having negative refractive power arranged in order from an object side to an image side. The second lens unit moves in focusing, thereby changing a distance between adjacent lens units. The first lens unit includes a positive lens, and the third lens unit includes a negative lens. A focal length of the positive lens, a focal length of the negative lens, a focal length of the third lens unit, and a back focus of the optical system are appropriately set.

18 Claims, 9 Drawing Sheets

OPTICAL SYSTEM AND IMAGING APPARATUS INCLUDING THE SAME

BACKGROUND

Field of the Disclosure

The present disclosure relates to an optical system suitable for imaging apparatuses such as a digital video camera, a digital still camera, a broadcast camera, a silver-halide film camera, and a monitoring camera.

Description of the Related Art

Telephoto-type optical systems of long focal lengths have been expected to possess high optical performance while being small.

Japanese Patent Application Laid-Open No. 2016-161643 discusses a telephoto-type optical system. This optical system is configured of a first lens unit having positive refractive power, a second lens unit having positive refractive power and moving in focusing, and a third lens unit having negative refractive power, which are arranged in order from an object side to an image side.

SUMMARY

According to an aspect of the present invention, an optical system includes a first lens unit having positive refractive power, a second lens unit, and a third lens unit having negative refractive power arranged in order from an object side to an image side, wherein the second lens unit moves in focusing, thereby changing a distance between adjacent lens units. The first lens unit includes a positive lens. The third lens unit includes a negative lens and the following conditional expressions are satisfied, $$LD/f < 1.000$$

$$0.010 < Sk/fGp < 0.170$$

$$0.050 < fGn/f3 < 0.155$$

where LD is a distance on an optical axis between a lens surface in the optical system closest to the object side and an image plane, f is a focal length of the optical system, Sk is a back focus of the optical system, fGp is a focal length of a positive lens Gp being a closest positive lens with respect to the object side in the first lens unit, fGn is a focal length of a negative lens Gn being a closest negative lens with respect to the image side in the third lens unit, and f3 is a focal length of the third lens unit.

Further features of the present invention will become apparent from the following description of exemplary embodiments with reference to the attached drawings.

DESCRIPTION OF THE EMBODIMENTS

Figure 1:
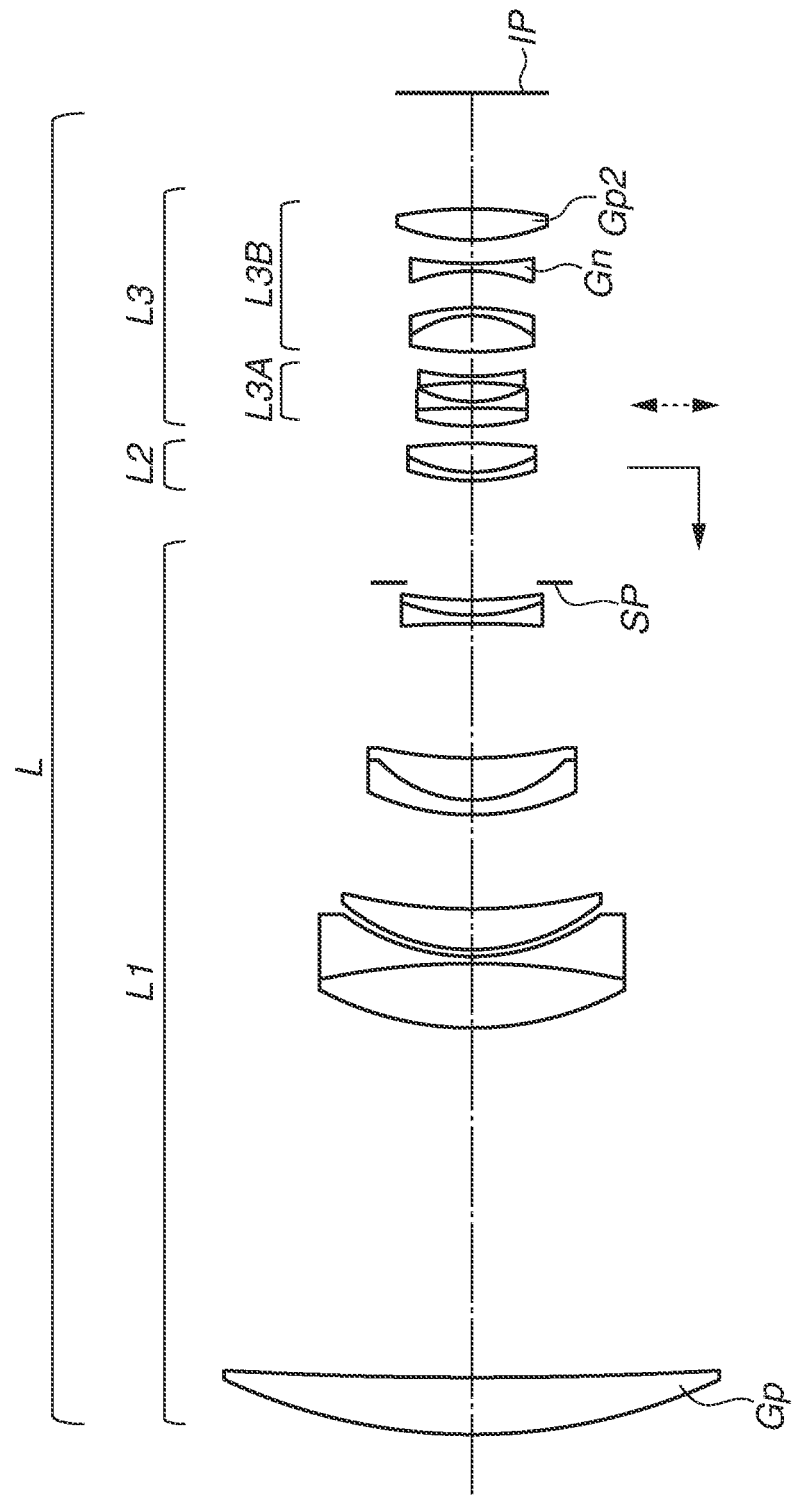
FIG. 1 is a cross-sectional diagram of an optical system according to a first exemplary embodiment.
Figure 2:
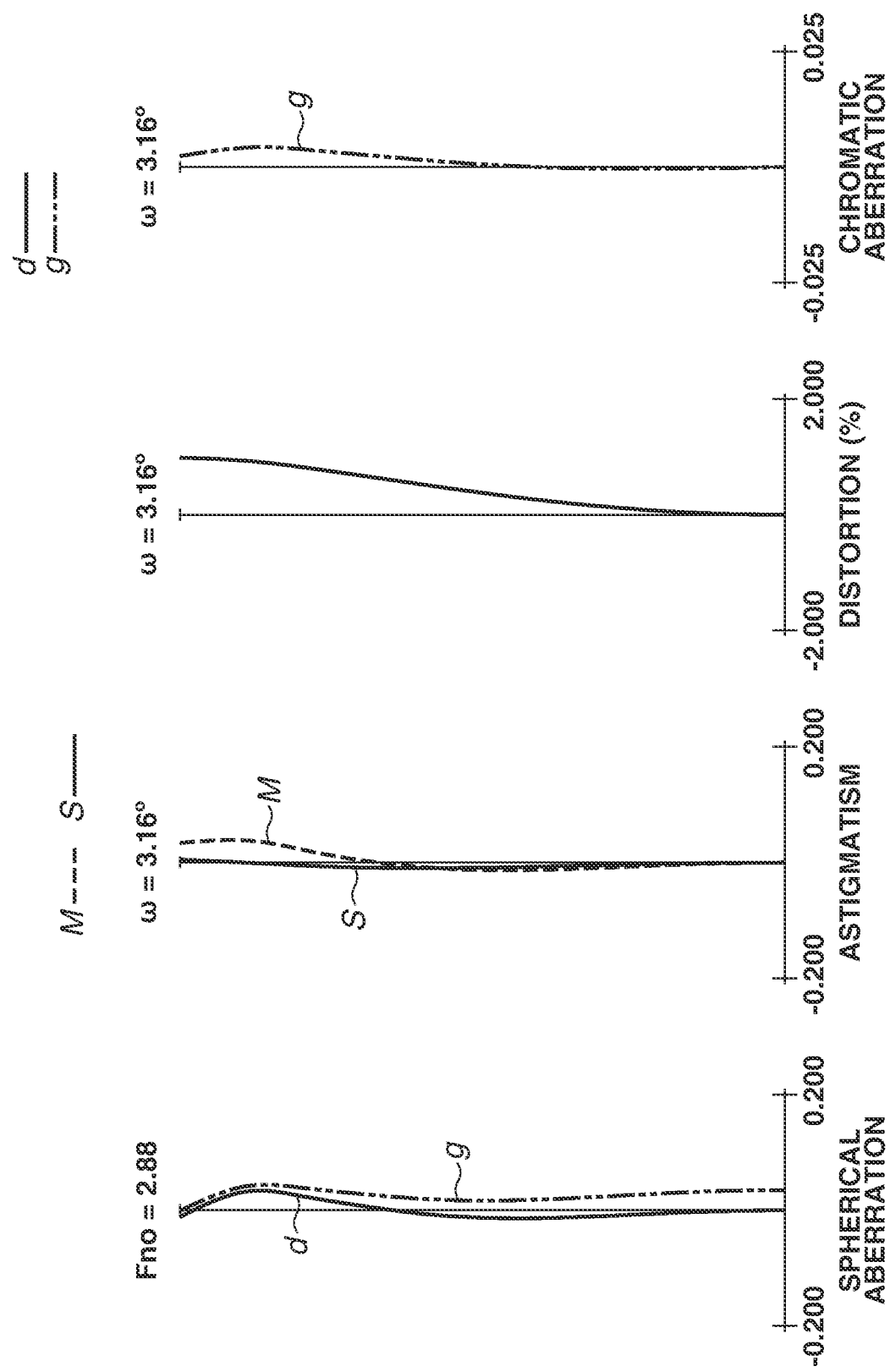
FIG. 2 is an aberration diagram of the optical system according to the first exemplary embodiment.
Figure 3:
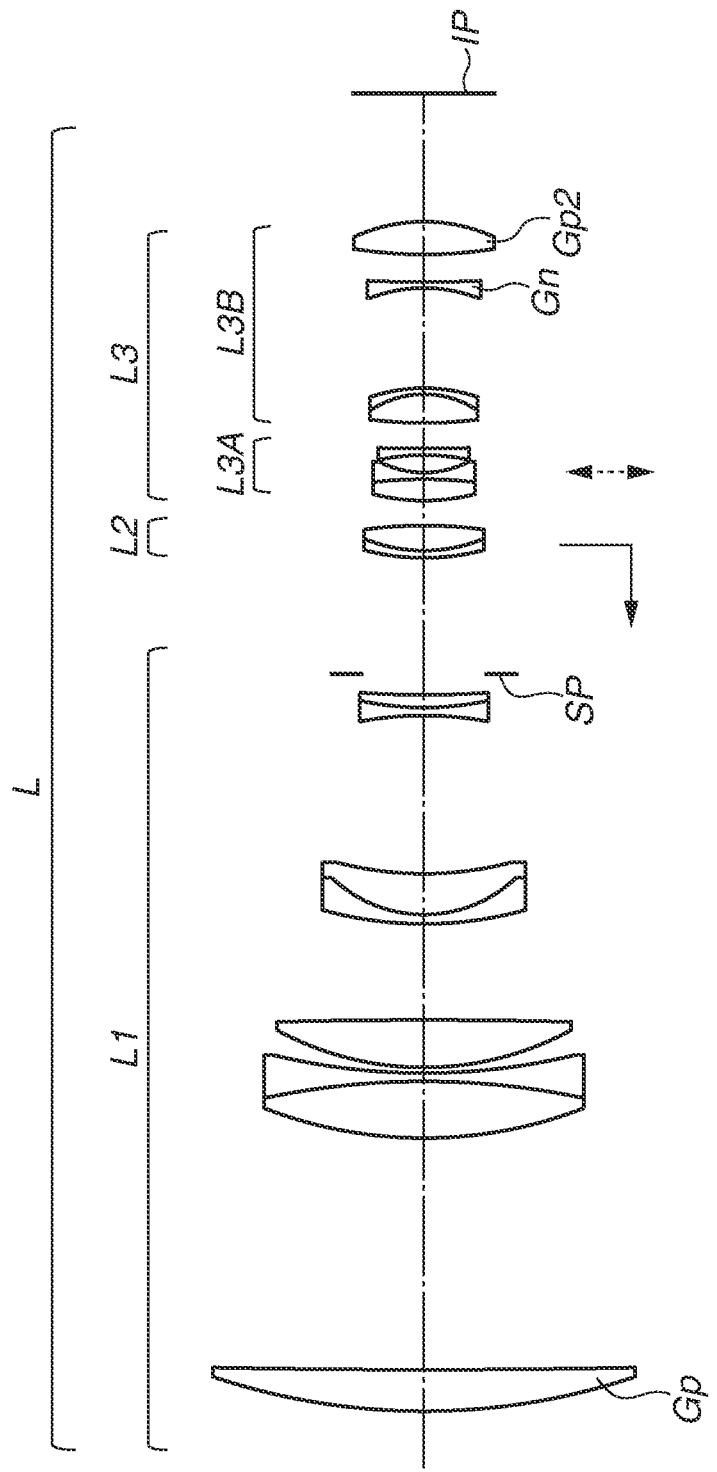
FIG. 3 is a cross-sectional diagram of an optical system according to a second exemplary embodiment.
Figure 4:
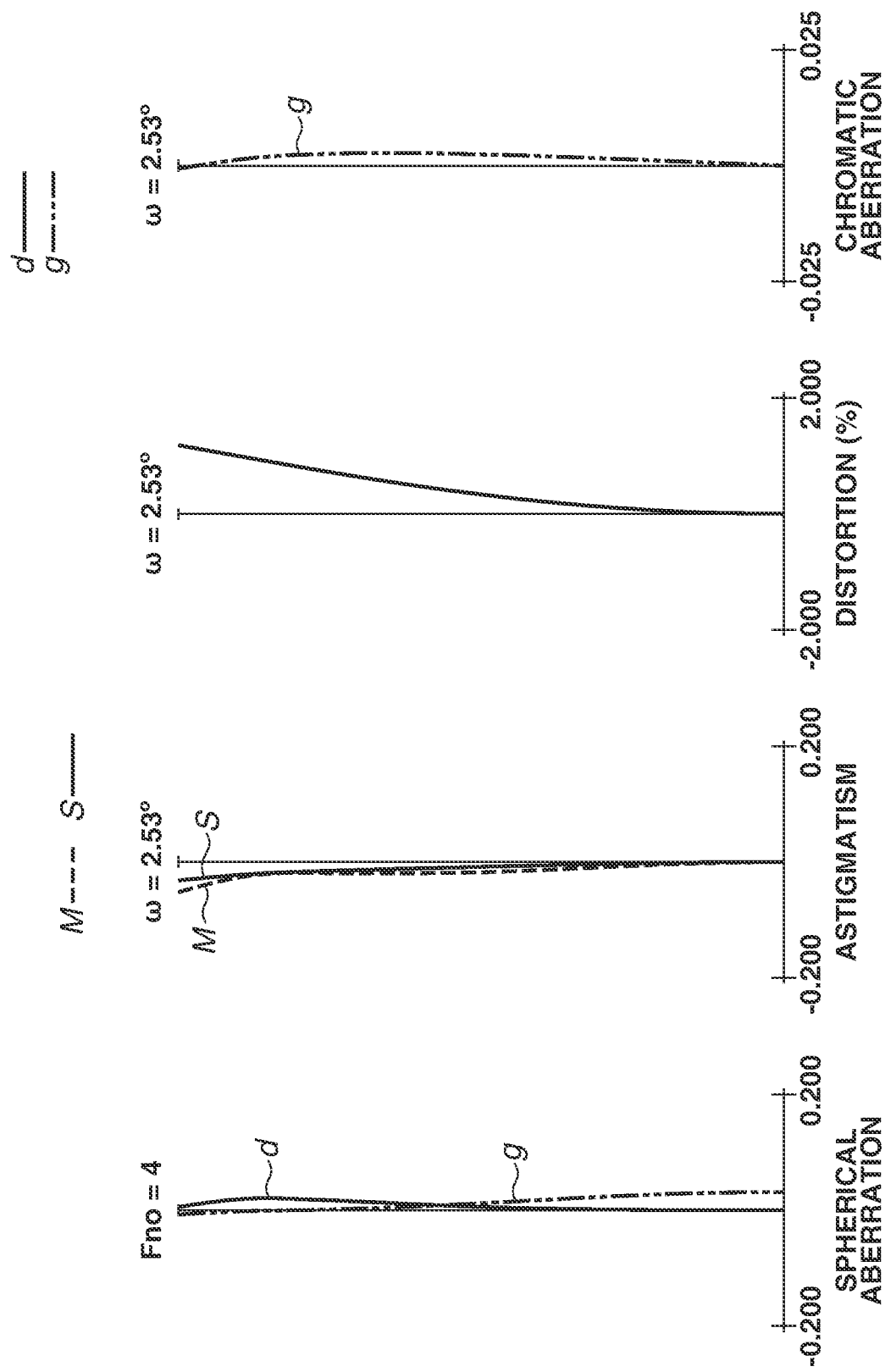
FIG. 4 is an aberration diagram of the optical system according to the second exemplary embodiment.
Figure 5:
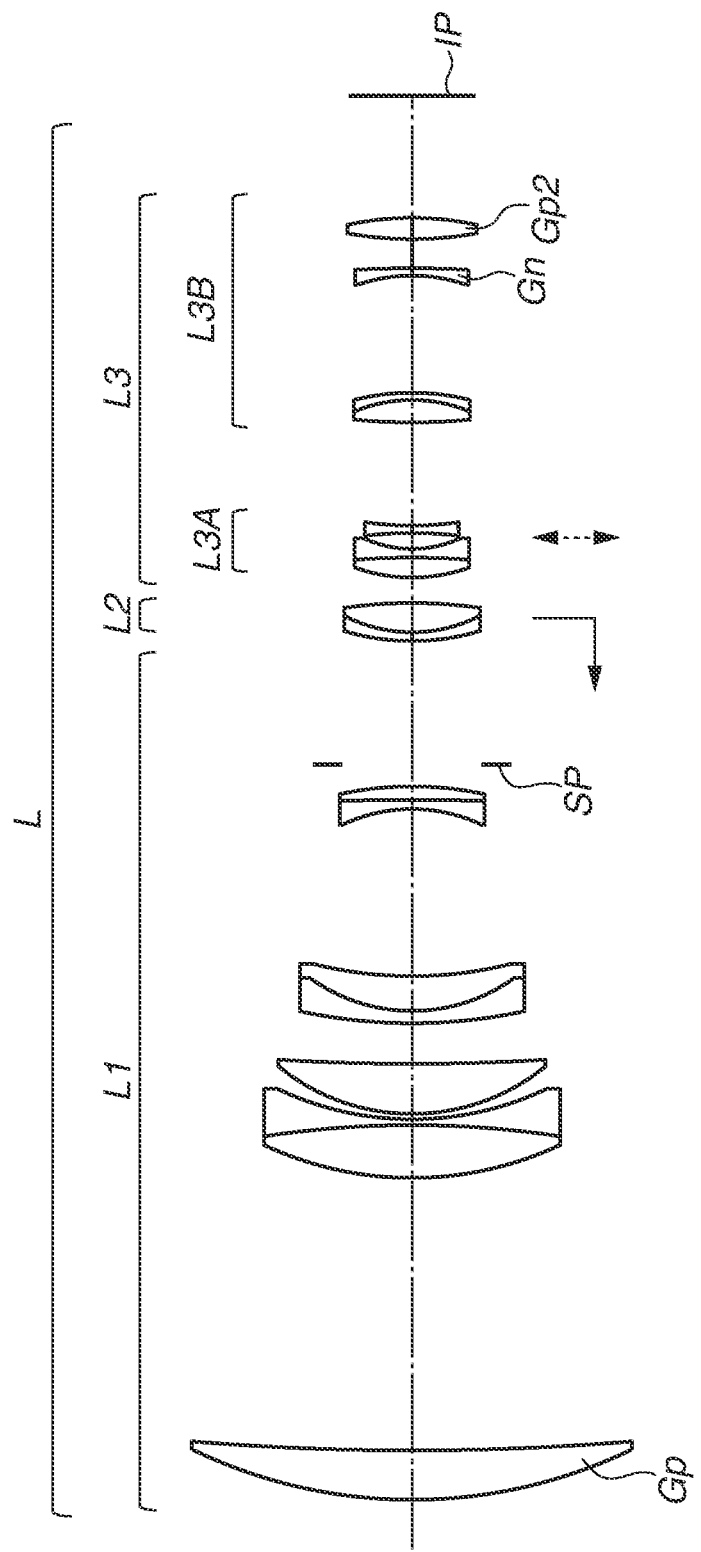
FIG. 5 is a cross-sectional diagram of an optical system according to a third exemplary embodiment.
Figure 6:
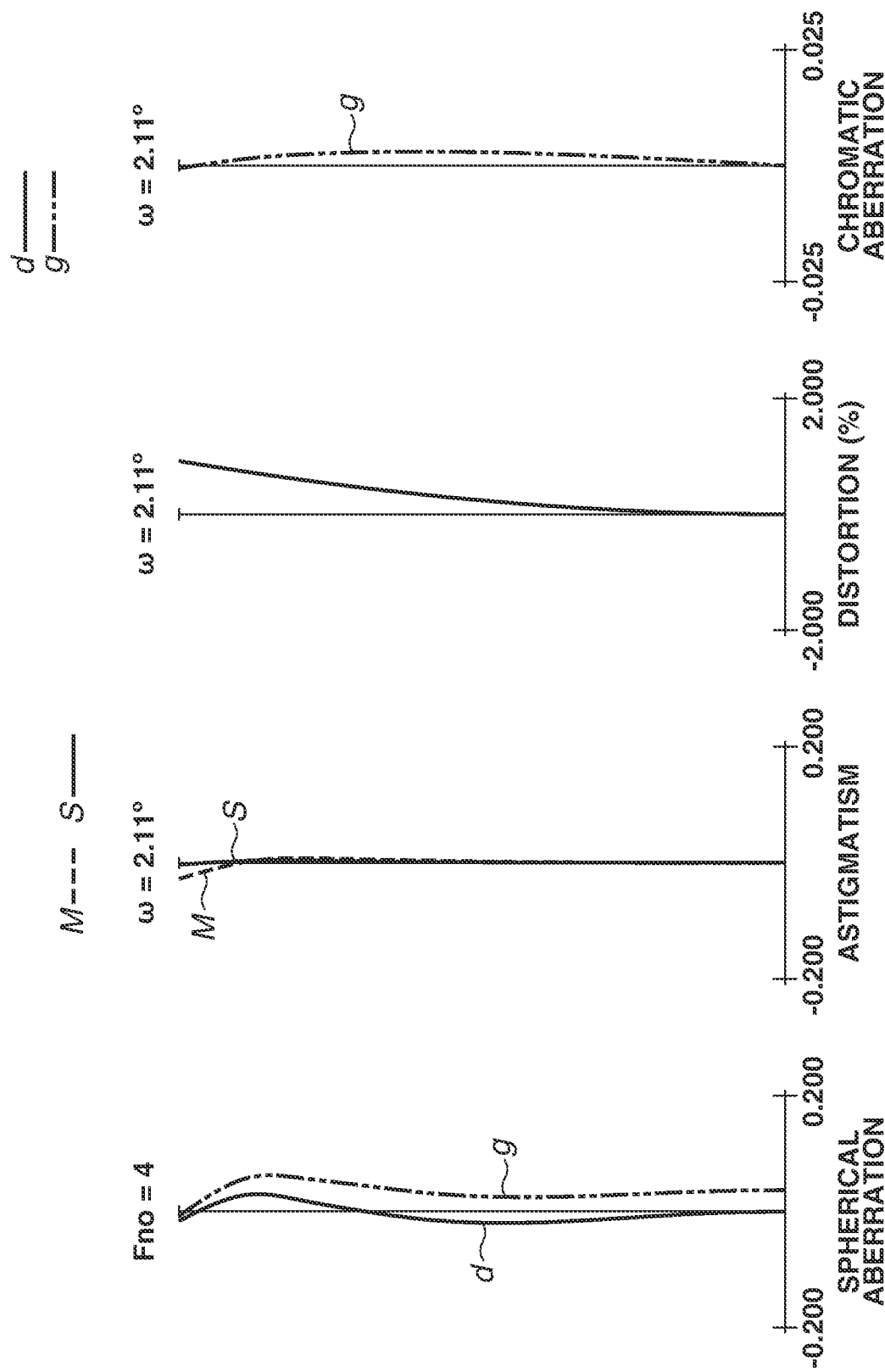
FIG. 6 is an aberration diagram of the optical system according to the third exemplary embodiment.
Figure 7:
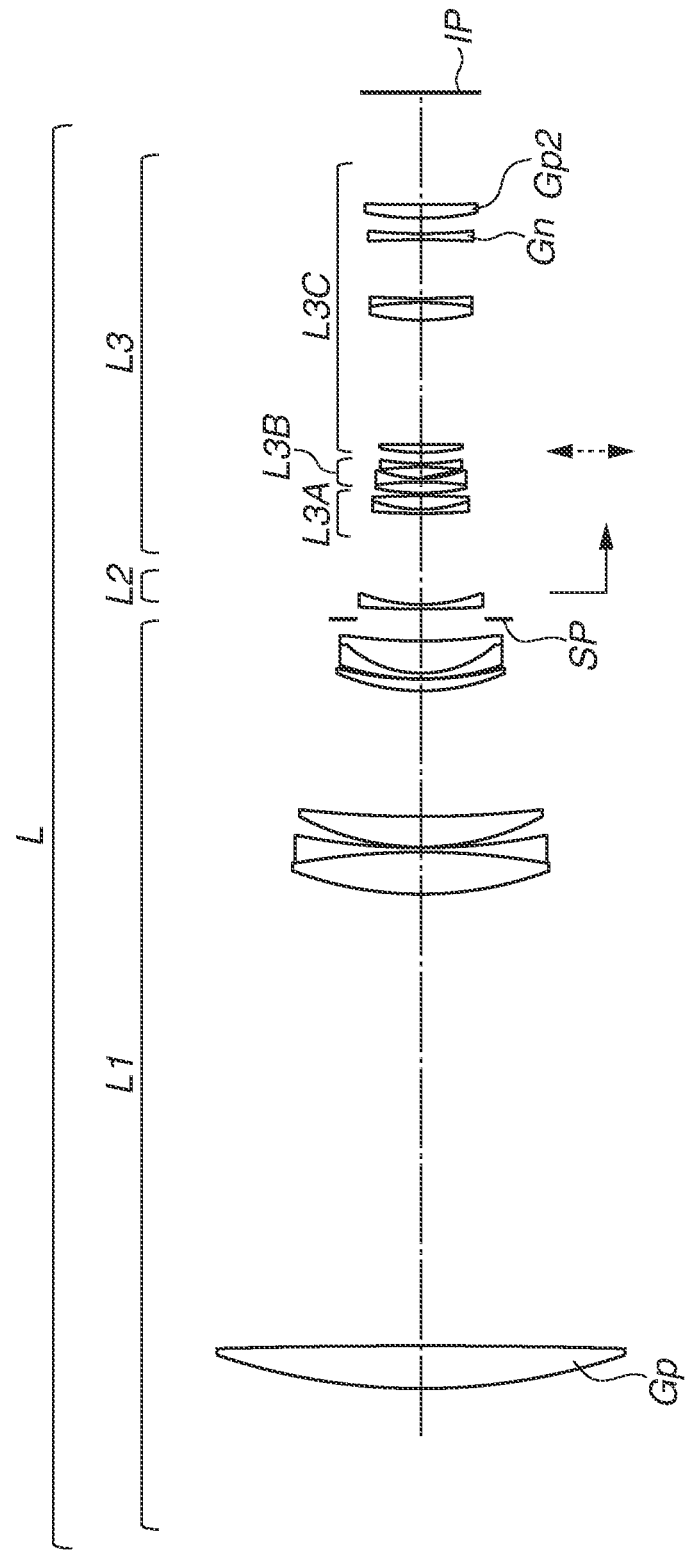
FIG. 7 is a cross-sectional diagram of an optical system according to a fourth exemplary embodiment.
Figure 8:
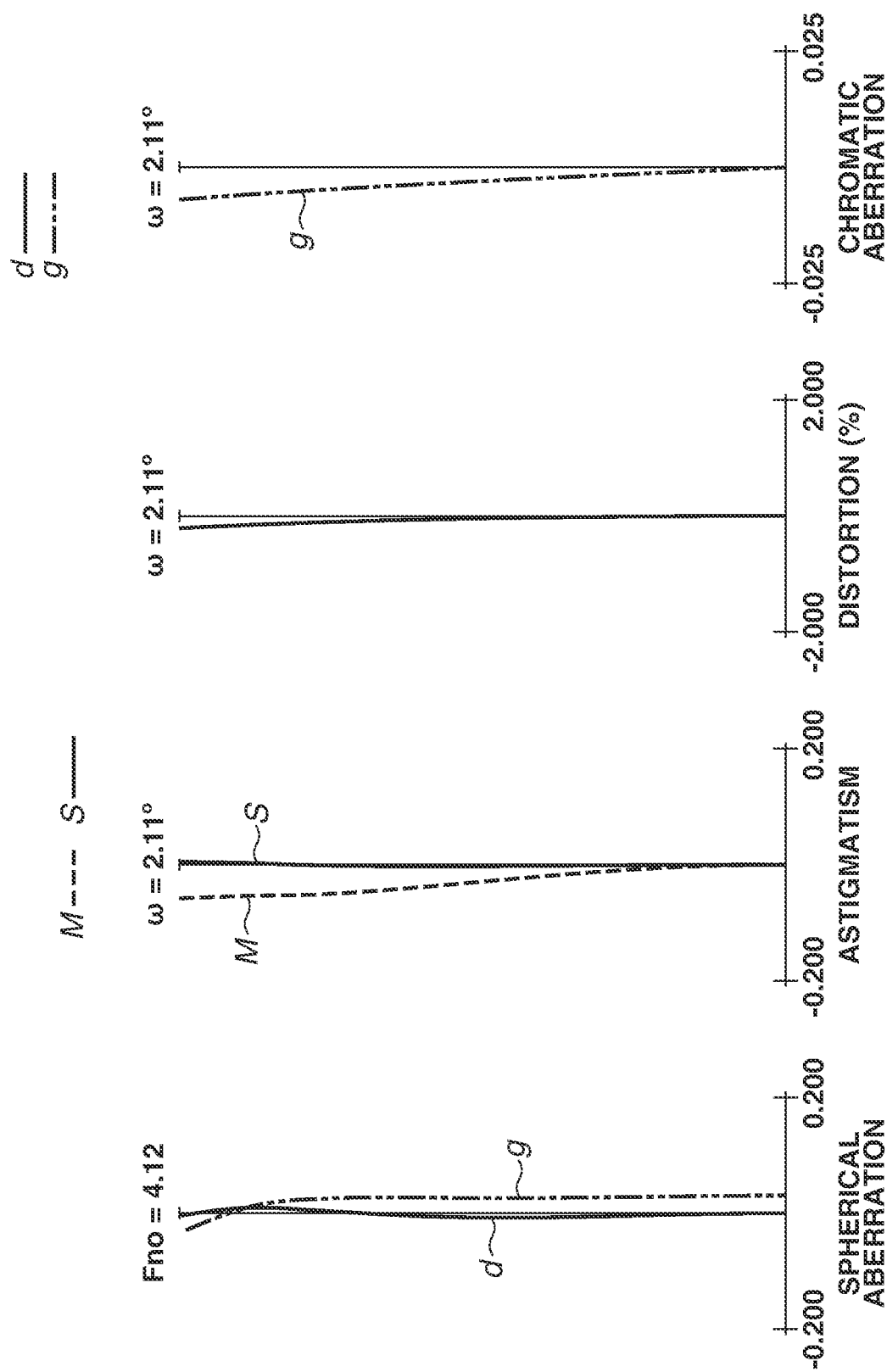
FIG. 8 is an aberration diagram of the optical system according to the fourth exemplary embodiment.

An optical system and an imaging apparatus including the same according to an exemplary embodiment of the present invention will be described below with reference to the attached drawings. Note that, the "refractive index" in the following description is a refractive index with respect to a d-line unless a wavelength is specified.

FIGS. 1, 3, 5, and 7 each illustrate a lens cross-sectional diagram of an optical system. FIGS. 1, 3, 5, and 7 correspond to first, second, third, and fourth exemplary embodiments, respectively.

An optical system L according to each of the exemplary embodiments is an image-capturing lens system to be used for imaging apparatuses such as a digital still camera, a video camera, a silver-halide film camera, and a broadcast camera. In the lens cross-sectional diagram, the left side is an object side (an enlargement side), and the right side is an image side (a reduction side).

The optical system L according to each of the exemplary embodiments is configured of a first lens unit L1 having positive refractive power, a second lens unit L2, and a third lens unit L3 having negative refractive power, which are arranged in order from the object side to the image side. The second lens unit L2 moves in focusing, thereby changing the distance between the adjacent lens units. The lens unit described in the present description is configured of one or a plurality of lenses, and is a component of the optical system L that relatively moves in focusing.

In the first to third exemplary embodiments, the second lens unit L2 has positive refractive power, and moves toward the object side in focusing from infinity to a short distance. In the fourth exemplary embodiment, the second lens unit L2 has negative refractive power, and moves toward the image side in focusing from infinity to a short distance.

An arrow indicated with a solid line in each of the cross-sectional diagrams represents a moving direction of the second lens unit L2 in focusing from the infinity to the short distance.

The first lens unit L1 is configured to include at least one positive lens. In the following description, a positive lens located closest to the object side among positive lenses included in the first lens unit L1 is a positive lens Gp.

A cover glass (a protective glass) having substantially no refractive power may be provided on the object side of the positive lens Gp. In other words, in the present description, an optical member having substantially no refractive power and located closest to the object side in the optical system L is not assumed to be the positive lens Gp. The term "having substantially no refractive power" indicates that the absolute value of the refractive power is one-fifth or less of the refractive power of the entire optical system.

Further, the third lens unit L3 is configured to include at least one negative lens. In the following description, a negative lens located closest to the image side among negative lenses included in the third lens unit L3 is a negative lens Gn.

An aperture stop SP determines (restricts) a light beam diameter of a full aperture F-number (Fno). In a case where the optical system L according to each of the exemplary embodiments is used for a video camera or a digital still camera, the imaging surface of a solid-state imaging element (a photoelectric conversion element) such as a charge coupled device (CCD) sensor or a complementary metal oxide semiconductor (CMOS) sensor is located at an image plane IP. In a case where the optical system L according to each of the exemplary embodiments is used for a silver-halide film camera, the photosensitive surface of a film is located at the image plane IP.

In the optical system L according to each of the exemplary embodiments, some of the lenses may have an image stabilization function. In other words, an image forming position may be changed by moving some of the lenses (an image stabilizing unit) of the optical system L in a direction including a component of a direction perpendicular to an optical axis in image stabilization. The image stabilization can be thereby performed. Any one of the first lens unit L1, the second lens unit L2, and the third lens unit L3 may be, as a whole, the image stabilizing unit. Alternatively, the image stabilizing unit may be provided in a part of the first lens unit L1, the second lens unit L2, and the third lens unit L3.

In the first to third exemplary embodiments, the third lens unit L3 is configured of a first sub lens unit L3A having negative refractive power and a second sub lens unit L3B having positive refractive power, which are arranged in order from the object side to the image side. The first sub lens unit L3A is provided as the image stabilizing unit. The diameter of the image stabilizing unit can be thereby reduced and therefore, the optical system L can be configured to be small.

Further, as in the optical system according to the fourth exemplary embodiment, the third lens unit L3 may be configured of a first sub lens unit L3A having positive refractive power, a second sub lens unit L3B having negative refractive power, and a third sub lens unit L3C having positive refractive power, which are arranged in order from the object side to the image side. The second sub lens unit L3B may be provided as the image stabilizing unit.

An arrow indicated with a dotted line in each of the cross-sectional diagrams represents a moving direction of the image stabilizing unit in image stabilization.

FIGS. 2, 4, 6, and 8 each illustrate an aberration diagram in focusing on an object at infinity. FIGS. 2, 4, 6, and 8 correspond to the first, second, third, and fourth exemplary embodiments, respectively.

In the aberration diagrams, Fno is an F-number. ω is a half field angle (a degree) and is calculated from a field angle based on paraxial calculation. In a spherical aberration diagram, d indicates a d-line (a wavelength of 587.56 nm), and g indicates a g-line (a wavelength of 435.835 nm).

In an astigmatism diagram, S indicates the d-line in a sagittal image plane, and M indicates the d-line in a meridional image plane. Distortion aberration is illustrated for the d-line. In a magnification chromatic aberration diagram, g indicates a chromatic aberration amount of the g-line with respect to the d-line.

Next, a feature of the optical system L according to each of the exemplary embodiments will be described.

A telephoto-type optical system can be configured to be small, by arranging a lens unit having positive refractive power and a lens unit having negative refractive power in order from an object side to an image side, i.e., by providing a so-called telephoto-type power arrangement. The optical system can be configured to be smaller, by increasing the refractive power of each of the lens units of the optical system.

However, if the refractive power of a first lens unit, in which the passage height of an on-axis beam and an off-axis beam is relatively high, is increased, an aberration amount produced in the first lens unit increases. For this reason, there is a case where it is difficult to correct aberration in a lens unit subsequent to the first lens unit.

Therefore, in the optical system according to each of the exemplary embodiments, the refractive power of the negative lens Gn located closest to the image side among the negative lenses included in the third lens unit L3 is appropriately set. This suppresses degradation of optical performance, while reducing a back focus. This also increases the negative refractive power of the third lens unit L3, thereby increasing the effect of the telephoto-type power arrangement. Therefore, the optical system can be configured to be smaller. Specifically, the optical system according to each of the exemplary embodiments satisfies all of the following conditional expressions (1) to (3).

$$LD/f < 1.000 \tag{1}$$

$$0.010 < Sk/fGp < 0.170 \tag{2}$$

$$0.050 < fGn/f3 < 0.155 \tag{3}$$

Here, LD is a full length of the optical system L. The full length of the optical system L is a distance on an optical axis of the optical system L from a lens surface closest to the object side to the image plane IP. In other words, the full length LD of the optical system L is a value determined by adding the back focus to a distance on the optical axis of the optical system L from the lens surface closest to the object side to a lens surface closest to the image side. f is a focal length of the optical system L. Sk is a back focus of the optical system L. fGp is a focal length of the positive lens Gp. fGn is a focal length of the negative lens Gn. f3 is a focal length of the third lens unit L3.

The conditional expression (1) indicates that the full length LD of the optical system is shorter than the focal length f of the entire optical system. In a case where the upper limit of the conditional expression (1) is exceeded, this is advantageous in terms of aberration correction, but the full length of the optical system increases, which makes it difficult to configure the optical system to be small. In addition, if the full length of the optical system increases, a lens barrel for holding the optical system increases in size. This leads to an increase in the weight of the lens apparatus including the optical system and the lens barrel and therefore is undesirable. Meanwhile, if the full length LD is extremely short relative to the focal length f, it is difficult to sufficiently correct aberration. Therefore, a lower limit may be set in the value range of LD/f, as indicated by conditional expressions (1a) and (1b) to be described below.

The conditional expression (2) defines the relationship between the focal length fGp of the positive lens Gp and the back focus Sk. The conditional expression (2) is intended to achieve compatibility between downsizing and higher performance of the optical system.

In a case where the upper limit of the conditional expression (2) is exceeded, the positive refractive power of the positive lens Gp decreases excessively, which leads to an increase in the diameter of the lens located on the image side of the positive lens Gp. This makes it difficult to configure the optical system to be small. In addition, if the back focus increases to the extent that the upper limit of the conditional expression (2) is exceeded, the full length of the optical system increases and therefore this case is undesirable.

In a case where the lower limit of the conditional expression (2) is exceeded, the refractive power of the positive lens Gp decreases excessively, which leads to an increase in a chromatic aberration amount produced in the positive lens Gp. This makes it difficult to correct aberration satisfactorily in the entire optical system L. In addition, in the case where the lower limit of the conditional expression (2) is exceeded, the back focus decreases excessively. In this case, the diameter of the last lens located closest to the image side of the optical system increases excessively, which leads to an increase in the diameter of a mount for attaching the optical system to the imaging apparatus. This makes it difficult to configure the optical system and the imaging apparatus to be small and lightweight. If an attempt is made to reduce the diameter of the last lens of the optical system, while decreasing the back focus to the extent that the lower limit of the conditional expression (2) is exceeded, the angle of a light ray incident on the imaging element increases. This results in an easy decline in image quality, in particular, in the peripheral portion of the image and is therefore undesirable.

The conditional expression (3) defines the relationship between the focal length f3 of the third lens unit L3 and the focal length fGn of the negative lens Gn. The conditional expression (3) is intended to suppress occurrence of aberration such as distortion aberration while configuring the optical system to be small.

In a case where the upper limit of the conditional expression (3) is exceeded, this is advantageous in terms of aberration correction, but it is difficult to reduce the full length of the optical system.

In a case where the lower limit of the conditional expression (3) is exceeded, the distortion aberration increases in the positive direction and therefore, this case is undesirable. In addition, in the case where the lower limit of the conditional expression (3) is exceeded, the back focus decreases excessively, which easily leads to an increase in the mount diameter and a decline in the image quality in the peripheral portion of the image. Therefore, this case is undesirable.

The numerical ranges of the respective expressions (1) to (3) described above are, desirably, the ranges of the following expressions (1a) to (3a), and more desirably, the ranges of the following expressions (1b) to (3b).

$$0.750 < LD/f < 0.990 \tag{1a}$$

$$0.050 < Sk/fGp < 0.140 \tag{2a}$$

$$0.060 < fGn/f3 < 0.152 \tag{3a}$$

$$0.780 < LD/f < 0.980 \tag{1b}$$

$$0.075 < Sk/fGp < 0.130 \tag{2b}$$

$$0.063 < fGn/f3 < 0.148 \tag{3b}$$

In the optical system L according to each of the exemplary embodiments, the lens located closest to the object side is, desirably, the positive lens Gp. This allows light entering the optical system to sufficiently converge. Therefore, the diameter of a lens located closer to the image side than the positive lens Gp can be sufficiently reduced. In other words, the optical system L can be configured to be smaller.

It is desirable to dispose a cemented lens formed by cementing a negative lens and a positive lens, at a position closest to the object side of the third lens unit L3. This makes it possible to achieve compatibility between correction of off-axis comatic aberration and correction of spherical aberration.

In addition, it is desirable that the second lens unit L2 have positive refractive power. This allows the light to further converge using the second lens unit L2, and the diameter of the third lens unit L3 can be thereby further reduced. Therefore, the optical system L can be configured to be smaller.

Moreover, when the positive lens located closest to the image side among the positive lenses included in the third lens unit is a positive lens Gp2, it is desirable that the positive lens Gp2 be located next to the negative lens Gn on the image side of the negative lens Gn. In other words, it is desirable that the positive lens Gp2 be located closest to the image side in the optical system L, and the negative lens Gn be located next to the positive lens Gp2 on the object side of the positive lens Gp2. This can reduce the incident angle on the imaging surface. Therefore, it is possible to suppress a reduction in light amount and a decline in image quality in an image peripheral portion, which become problems in a case where a CCD sensor or a CMOS sensor is used as the imaging element.

It is also desirable that a negative lens be further disposed next to the negative lens Gn on the object side of the negative lens Gn, in order to obtain higher optical performance.

It is also desirable that the optical system according to each of the exemplary embodiments satisfy one or more of the following conditional expressions.

$$0.600 < (R2+R1)/(R2-R1) < 2.000 \tag{4}$$

$$-5.000 < f3/f2 < -3.000 \tag{5}$$

$$1.100 < |fGp2/fGn| < 2.500 \tag{6}$$

$$1.100 < vdGp2/vdGn < 3.000 \tag{7}$$

$$0.050 < f/f1 < 0.700 \tag{8}$$

$$0.010 < f2/f1 < 0.075 \tag{9}$$

$$0.300 < dFI/LD < 0.550 \tag{10}$$

$$0.160 < D12/LD < 0.400 \tag{11}$$

$$0.050 < Sk/IH < 2.200 \tag{12}$$

Here, R1 is a curvature radius of a lens surface on the object side of the positive lens Gp, and R2 is a curvature radius of a lens surface on the image side of the positive lens Gp. f2 is a focal length of the second lens unit L2. fGp2 is a focal length of the positive lens Gp2 located closest to the image side among the positive lenses included in the third lens unit L3. vdGp2 is an Abbe number of the positive lens Gp2, and vdGn is an Abbe number of the negative lens Gn. Here, the Abbe number vd is an amount defined in the following expression (A), where the respective refractive indexes in the d-line, an F-line, and a C-line of a Fraunhofer's line are Nd, NF, and NC.

$$vd=(Nd-1)/(NF-NC) \tag{A}$$

Further, dFI is a distance on the optical axis from the aperture stop SP to the image plane IP. D12 is a distance on the optical axis, between a lens located closest to the object side in the first lens unit L1 (the positive lens Gp, in the optical system L according to each of the exemplary embodiments) and a lens located next to the former lens on the image side of the former lens. In other words, D12 is a distance on the optical axis, from a lens surface on the image side of a lens located closest to the object side in the first lens unit L1, to a lens surface on the object side of a lens located next to the former lens on the image side of the former lens. IH is a maximum image height. The maximum image height IH indicates the length of a half of a diagonal length in a use range of an imaging element to be used for forming an output image.

The conditional expression (4) defines a shape factor of the positive lens Gp and is a condition for satisfactorily correcting spherical aberration.

If the upper limit of the conditional expression (4) is exceeded, the meniscus shape of the positive lens intensifies, which easily causes distortion aberration strongly on the positive side and therefore, this case is undesirable. In addition, if the upper limit of the conditional expression (4) is exceeded, it is difficult to manufacture the positive lens Gp. If the lower limit of the conditional expression (4) is exceeded, overcorrection of spherical aberration easily occurs and therefore, this case is undesirable.

The conditional expression (5) defines the relationship between the focal length f3 of the third lens unit L3 and the focal length f2 of the second lens unit L2 in a case where the second lens unit L2 has the positive refractive power. The conditional expression (5) is provided so that suppression of the variation of aberration such as spherical aberration due to focusing and correction of field curvature are compatible when the conditional expression (5) is satisfied.

If the upper limit of the conditional expression (5) is exceeded, the refractive power of the third lens unit L3 increases excessively. Therefore, it is difficult to satisfactorily correct the field curvature while achieving an appropriate length of the back focus. If the lower limit of the conditional expression (5) is exceeded, the refractive power of the second lens unit L2 increases excessively. Therefore, it is difficult to sufficiently reduce the variation of spherical aberration and on-axis chromatic aberration due to focusing.

The conditional expression (6) defines the relationship between the refractive power of the positive lens Gp2 located closest to the image side and the refractive power of the negative lens Gn, among the positive lenses included in the third lens unit L3. The conditional expression (6) is intended to reduce the full length of the optical system L while correcting distortion aberration and magnification chromatic aberration satisfactorily.

In a case where the upper limit of the conditional expression (6) is exceeded, this is advantageous in terms of a reduction in the full length of the optical system L, but undercorrection of distortion aberration and magnification chromatic aberration easily occurs. In a case where the lower limit of the conditional expression (6) is exceeded, field curvature and distortion aberration increase and therefore, this case is undesirable.

The conditional expression (7) defines the ratio between the Abbe number of the positive lens Gp2 and the Abbe number of the negative lens Gn in the third lens unit L3. The conditional expression (7) is intended to satisfactorily correct magnification chromatic aberration.

In a case where the upper limit of the conditional expression (7) is exceeded, a curvature radius for obtaining the refractive power of a lens necessary for satisfactory correction of magnification chromatic aberration increases excessively. As a result, it is difficult to achieve compatibility between the reduction in the full length of the optical system L and the correction of the magnification chromatic aberration.

In a case where the lower limit of the conditional expression (7) is exceeded, the curvature radius for obtaining the refractive power of a lens necessary for satisfactory correction of the magnification chromatic aberration decreases excessively. This increases high order components of the field curvature and the magnification chromatic aberration and therefore, this case is undesirable.

The conditional expression (8) defines the ratio between the focal length f of the entire optical system L and the focal length f1 of the first lens unit L1.

If the focal length f1 of the first lens unit L decreases to the extent that the upper limit of the conditional expression (8) is exceeded, convergence of a light beam entering the second lens unit L2 intensifies. This easily increases the variation of spherical aberration and on-axis chromatic aberration due to focusing and therefore, this case is undesirable.

If the focal length f1 of the first lens unit L1 increases to the extent that the lower limit of the conditional expression (8) is exceeded, the refractive power of the first lens unit L1 decreases excessively. This leads to an increase in the full length of the optical system L or increases in the diameters of the lenses included in the second lens unit L2 and the third lens unit L3 and therefore, this case is undesirable.

The conditional expression (9) defines the ratio between the focal length of the second lens unit L2 and the focal length of the first lens unit L1, in a case where the second lens unit L2 has the positive refractive power. The conditional expression (9) is intended to appropriately correct the variation of spherical aberration due to focusing.

If the upper limit of the conditional expression (9) is exceeded, the focal length f1 of the first lens unit L1 decreases excessively. In this case, the refractive power of the first lens unit L1 increases excessively, and the convergence of the light beam entering the second lens unit L2 intensifies excessively. At this time, to reduce the variation of various aberrations due to focusing, it is necessary to increase the refractive power of the second lens unit L2. In this case, however, the sensitivity of spherical aberration in the second lens unit L2 increases and thus manufacturing is difficult. Therefore, this case is undesirable.

If the lower limit of the conditional expression (9) is exceeded, the refractive power of the second lens unit L2 increases excessively relative to the refractive power of the first lens unit L1. This case is advantageous in terms of a reduction in the full length of the optical system L, but the variation of the on-axis chromatic aberration due to focusing increases. Therefore, this case is undesirable.

The conditional expression (10) defines a desirable location of the aperture stop SP in a case where the aperture stop SP is located on the object side of the second lens unit L2.

If the upper limit of the conditional expression (10) is exceeded, the incident height of a light ray entering the second lens unit L2 increases, and the variation of spherical aberration due to focusing increases. In addition, the variation of comatic aberration due to decentering increases and therefore, this case is undesirable. If the value falls below the lower limit of the conditional expression (10), an amount of movement of the second lens unit L2 in focusing increases. This results in an increase in the size of the optical system L.

The conditional expression (11) defines the relationship between the distance D12, which is the distance between two lenses located closest to the object side in the optical system L and the full length LD of the optical system. In a case where the upper limit of the conditional expression (11) is exceeded, this is advantageous in terms of a reduction in the weight of the optical system. However, it is difficult to sufficiently correct spherical aberration and chromatic aberration occurring in the lens located closest to the object side of the optical system L, using the subsequent lens. Therefore, this case is undesirable. In a case where the value falls below the lower limit of the conditional expression (11), the diameter of a lens located closer to the image side than the lens located closest to the object side in the optical system L increases excessively. Therefore, it is difficult to provide a configuration for reducing the weight of the optical system sufficiently, and thus this case is undesirable.

The conditional expression (12) defines the relationship between the back focus Sk of the optical system and the maximum image height IH. If the upper limit of the conditional expression (12) is exceeded, the full length increases excessively, which increases the weight of a mechanical member (such as the lens barrel) for holding the optical system. Therefore, it is difficult to reduce the weight of the optical system. If the value falls below the lower limit of the conditional expression (12), the back focus decreases excessively. In this case, the diameter of the lens located closest to the image on the image side of the optical system increases excessively, which increases the diameter of the mount for attaching the optical system to the imaging apparatus. As a result, it is difficult to configure the optical system and the imaging apparatus to be small and lightweight. If an attempt is made to reduce the diameter of the last lens of the optical system while decreasing the back focus to the extent that the lower limit of the conditional expression (12) is exceeded, the angle of a light ray incident on the imaging element increases. This results in a decline in the image quality, in particular, in the peripheral portion of the image and therefore, this case is undesirable.

It is more desirable to set the numerical ranges of the respective conditional expressions (4) to (12), as in the following expressions (4a) to (12a).

$$0.700 < (R2+R1)/(R2-R1) < 1.600 \quad (4a)$$

$$-4.500 < f3/f2 < -3.300 \quad (5a)$$

$$1.200 < |fGp2/fGn| < 2.300 \quad (6a)$$

$$1.200 < \nu dGp2/\nu dGn < 2.500 \quad (7a)$$

$$0.050 < f/f1 < 0.600 \quad (8a)$$

$$0.020 < f2/f1 < 0.070 \quad (9a)$$

$$0.350 < dFl/LD < 0.540 \quad (10a)$$

$$0.165 < D12/LD < 0.380 \quad (11a)$$

$$1.000 < Sk/IH < 2.100 \quad (12a)$$

It is still more desirable to set the numerical ranges of the respective conditional expressions (4) to (12), as in the following expressions (4b) to (12b).

$$0.800 < (R2+R1)/(R2-R1) < 1.500 \quad (4b)$$

$$-4.200 < f3/f2 < -3.500 \quad (5b)$$

$$1.300 < |fGp2/fGn| < 2.000 \quad (6b)$$

$$1.200 < \nu dGp2/\nu dGn < 2.100 \quad (7b)$$

$$0.200 < f/f1 < 0.300 \quad (8b)$$

$$0.050 < f2/f1 < 0.065 \quad (9b)$$

$$0.380 < dFl/LD < 0.530 \quad (10b)$$

$$0.170 < D12/LD < 0.360 \quad (11b)$$

$$1.200 < Sk/IH < 2.000 \quad (12b)$$

Next, first to fourth numerical examples corresponding to the first to fourth exemplary embodiments, respectively, will be described. In each of the numerical examples, a surface number indicates the position in an optical surface order counted from the object side. ri is a curvature radius of an i-th (i is a natural number) optical surface (an i-th surface) counted from the object side, and di is a distance between the i-th surface and an i+1th surface. ndi, vdi, and θgFi are a refractive index, an Abbe number, and a partial dispersion ratio, respectively, of an i-th optical member. The partial dispersion ratio θgF is an amount defined by the following expression (B), where the respective refractive indexes in the g-line, the d-line, the F-line, and the C-line of the Fraunhofer's line are Ng, Nd, NF, and NC.

$$\theta gF = (Ng-NF)/(NF-NC) \quad (B)$$

Each of the distance between the second lens unit L2 and the aperture stop SP and the distance between the second lens unit L2 and the third lens unit L3 is a distance in focusing on an object at infinity.

In each of the numerical examples, the back focus (BF) represents a distance from the surface closest to the image side of the optical system L to the image plane, in air-converted length.

In each of the exemplary embodiments, a protective glass or a low-pass filter may be disposed between the lens located closest to the image side and the image plane IP. In the present description, an optical member having extremely weak refractive power such as the protective glass or the low-pass filter located closest to the image side of the optical system is not treated as a lens included in the optical system. The term "extremely weak refractive power" indicates that, as described above, the absolute value of a focal length is five times or more the focal length of the entire optical system.

In a case where the optical member having extremely weak refractive power is disposed between the optical system L and the image plane IP (the imaging element), the value of each of the above-described parameters Sk, L, and LD is determined by performing air conversion with respect to the optical member having extremely weak refractive power and disposed between the optical system and the image plane.

First Numerical Example

| Unit mm | | | | | |
|---|---|---|---|---|---|
| Surface data | | | | | |
| Surface number | r | d | nd | νd | θgF |
| 1 | 165.519 | 16.15 | 1.61800 | 63.40 | 0.5395 |
| 2 | 1237.782 | 99.07 | | | |
| 3 | 91.530 | 18.28 | 1.43700 | 95.10 | 0.5326 |
| 4 | −205.819 | 2.00 | 1.61340 | 44.27 | 0.5633 |
| 5 | 62.066 | 1.93 | | | |
| 6 | 57.229 | 11.51 | 1.43700 | 95.10 | 0.5326 |
| 7 | 150.871 | 26.68 | | | |
| 8 | 69.632 | 4.20 | 1.79952 | 42.22 | 0.5672 |
| 9 | 36.781 | 11.90 | 1.43700 | 95.10 | 0.5326 |
| 10 | 122.301 | 38.11 | | | |

-continued

Unit mm

| | | | | |
|---|---|---|---|---|
| 11 | −280.484 | 2.40 | 1.72916 | 54.68 | 0.5444 |
| 12 | 56.242 | 4.30 | 1.89286 | 20.36 | 0.6393 |
| 13 | 120.046 | 5.00 | | | |
| 14 (stop) | ∞ | 28.83 | | | |
| 15 | 58.292 | 2.40 | 1.72000 | 43.69 | 0.5699 |
| 16 | 38.857 | 8.11 | 1.53775 | 74.70 | 0.5392 |
| 17 | −154.955 | 4.91 | | | |
| 18 | 62.730 | 5.16 | 1.88300 | 40.76 | 0.5667 |
| 19 | −232.969 | 1.80 | 1.59522 | 67.74 | 0.5442 |
| 20 | 32.442 | 5.37 | | | |
| 21 | −96.657 | 1.80 | 1.53775 | 74.70 | 0.5392 |
| 22 | 70.777 | 6.93 | | | |
| 23 | 87.618 | 10.28 | 1.78472 | 25.68 | 0.6161 |
| 24 | −29.266 | 2.20 | 1.89286 | 20.36 | 0.6393 |
| 25 | −62.544 | 10.40 | | | |
| 26 | −48.695 | 2.20 | 1.89286 | 20.36 | 0.6393 |
| 27 | 111.184 | 6.65 | | | |
| 28 | 58.701 | 8.79 | 1.58144 | 40.75 | 0.5774 |
| 29 | −117.297 | 32.79 | | | |
| Image plane | ∞ | | | | |

Various data

| | |
|---|---|
| Focal length | 392.00 |
| F-number | 2.88 |
| Field angle | 3.16 |
| Image height | 21.64 |
| Overall lens length | 380.13 |
| BF (Sk) | 32.79 |

Lens unit data

| Unit | Starting surface | Focal length |
|---|---|---|
| 1 | 1 | 1500.00 |
| 2 | 15 | 90.82 |
| 3 | 18 | −340.98 |

Second Numerical Example

Unit mm

Surface data

| Surface number | r | d | nd | νd | θgF |
|---|---|---|---|---|---|
| 1 | 198.887 | 12.42 | 1.61800 | 63.40 | 0.5395 |
| 2 | 2935.195 | 69.51 | | | |
| 3 | 132.429 | 16.99 | 1.43700 | 95.10 | 0.5326 |
| 4 | −230.160 | 2.49 | 1.71300 | 53.87 | 0.5459 |
| 5 | 191.704 | 1.69 | | | |
| 6 | 92.135 | 14.23 | 1.43700 | 95.10 | 0.5326 |
| 7 | −1701.379 | 28.83 | | | |
| 8 | 112.729 | 2.80 | 1.79952 | 42.22 | 0.5672 |
| 9 | 39.967 | 12.26 | 1.43700 | 95.10 | 0.5326 |
| 10 | 102.785 | 47.44 | | | |
| 11 | −103.357 | 2.40 | 1.67790 | 55.34 | 0.5472 |
| 12 | 90.910 | 3.80 | 1.89286 | 20.36 | 0.6393 |
| 13 | 282.493 | 6.20 | | | |
| 14 (stop) | ∞ | 34.87 | | | |
| 15 | 68.655 | 2.20 | 1.72000 | 41.98 | 0.5729 |
| 16 | 46.688 | 7.52 | 1.49700 | 81.54 | 0.5375 |
| 17 | −132.372 | 7.48 | | | |
| 18 | 60.893 | 6.41 | 1.88300 | 40.76 | 0.5667 |
| 19 | −128.889 | 2.00 | 1.59522 | 67.74 | 0.5442 |
| 20 | 29.059 | 5.24 | | | |
| 21 | −64.743 | 2.00 | 1.71300 | 53.87 | 0.5459 |
| 22 | 544.729 | 7.64 | | | |
| 23 | 126.785 | 8.62 | 1.59551 | 39.24 | 0.5803 |
| 24 | −28.785 | 1.80 | 1.84666 | 23.88 | 0.6218 |
| 25 | −49.890 | 30.04 | | | |
| 26 | −45.013 | 1.80 | 1.83220 | 40.10 | 0.5714 |
| 27 | 410.829 | 8.28 | | | |

-continued

Unit mm

| | | | | | |
|---|---|---|---|---|---|
| 28 | 133.782 | 9.81 | 1.51742 | 52.43 | 0.5564 |
| 29 | −50.319 | 38.46 | | | |
| Image plane | ∞ | | | | |

Various data

| | |
|---|---|
| Focal length | 490.00 |
| F-number | 4.00 |
| Field angle | 2.53 |
| Image height | 21.64 |
| Overall lens length | 395.23 |
| BF (Sk) | 38.46 |

Lens unit data

| Unit | Starting surface | Focal length |
|---|---|---|
| 1 | 1 | 1800.00 |
| 2 | 15 | 106.72 |
| 3 | 18 | −379.37 |

Third Numerical Example

Unit mm

Surface data

| Surface number | r | d | nd | νd | θgF |
|---|---|---|---|---|---|
| 1 | 173.681 | 16.88 | 1.61800 | 63.40 | 0.5395 |
| 2 | 923.660 | 93.24 | | | |
| 3 | 119.951 | 18.07 | 1.43700 | 95.10 | 0.5326 |
| 4 | −336.930 | 2.00 | 1.72000 | 43.69 | 0.5699 |
| 5 | 107.340 | 1.87 | | | |
| 6 | 72.603 | 17.12 | 1.43700 | 95.10 | 0.5326 |
| 7 | 750.579 | 13.88 | | | |
| 8 | 183.029 | 4.20 | 1.71300 | 53.87 | 0.5459 |
| 9 | 60.039 | 11.90 | 1.43700 | 95.10 | 0.5326 |
| 10 | 139.315 | 57.16 | | | |
| 11 | −55.827 | 3.20 | 1.77250 | 49.60 | 0.5520 |
| 12 | −646.205 | 4.55 | 1.89286 | 20.36 | 0.6393 |
| 13 | −117.279 | 7.47 | | | |
| 14 (stop) | ∞ | 42.28 | | | |
| 15 | 80.702 | 3.00 | 1.72000 | 43.69 | 0.5699 |
| 16 | 50.803 | 10.01 | 1.49700 | 81.54 | 0.5375 |
| 17 | −161.109 | 8.71 | | | |
| 18 | 57.865 | 6.80 | 1.88300 | 40.76 | 0.5667 |
| 19 | −277.315 | 3.00 | 1.59522 | 67.74 | 0.5442 |
| 20 | 39.167 | 5.46 | | | |
| 21 | −130.158 | 2.50 | 1.83481 | 42.73 | 0.5648 |
| 22 | 106.719 | 35.33 | | | |
| 23 | 208.590 | 7.64 | 1.60342 | 38.03 | 0.5835 |
| 24 | −51.727 | 2.50 | 1.89286 | 20.36 | 0.6393 |
| 25 | −80.577 | 40.07 | | | |
| 26 | −56.729 | 2.50 | 1.83481 | 42.73 | 0.5648 |
| 27 | −389.119 | 9.98 | | | |
| 28 | 122.996 | 7.29 | 1.51742 | 52.43 | 0.5564 |
| 29 | −103.071 | 41.71 | | | |
| Image plane | ∞ | | | | |

Various data

| | |
|---|---|
| Focal length | 588.00 |
| F-number | 4.00 |
| Field angle | 2.11 |
| Image height | 21.64 |
| Overall lens length | 480.33 |
| BF (Sk) | 41.71 |

-continued

Unit mm

Lens unit data

| Unit | Starting surface | Focal length |
|---|---|---|
| 1 | 1 | 2250.00 |
| 2 | 15 | 132.58 |
| 3 | 18 | −547.36 |

Fourth Numerical Example

Unit mm

Surface data

| Surface number | r | d | nd | vd | θgF |
|---|---|---|---|---|---|
| 1 | 228.503 | 15.36 | 1.43700 | 95.10 | 0.5326 |
| 2 | −2577.136 | 162.01 | | | |
| 3 | 131.311 | 15.04 | 1.43700 | 95.10 | 0.5326 |
| 4 | −260.464 | 0.00 | | | |
| 5 | −260.464 | 1.60 | 1.83400 | 37.34 | 0.5790 |
| 6 | 226.189 | 0.25 | | | |
| 7 | 92.135 | 10.96 | 1.43700 | 95.10 | 0.5326 |
| 8 | 385.486 | 45.08 | | | |
| 9 | 75.184 | 4.17 | 1.84666 | 23.88 | 0.6218 |
| 10 | 116.037 | 0.15 | | | |
| 11 | 89.110 | 2.00 | 1.80420 | 46.50 | 0.5572 |
| 12 | 40.121 | 11.55 | 1.43700 | 95.10 | 0.5326 |
| 13 | 188.425 | 7.90 | | | |
| 14 (stop) | ∞ | 3.59 | | | |
| 15 | 357.665 | 1.60 | 1.59349 | 67.00 | 0.5361 |
| 16 | 60.453 | 32.67 | | | |
| 17 | 234.160 | 1.50 | 1.89286 | 20.36 | 0.6393 |
| 18 | 51.127 | 4.79 | 1.73800 | 32.26 | 0.5899 |
| 19 | −323.381 | 1.00 | | | |
| 20 | 77.098 | 4.01 | 1.80518 | 25.46 | 0.6156 |
| 21 | −115.926 | 1.30 | 1.59349 | 67.00 | 0.5361 |
| 22 | 42.855 | 4.05 | | | |
| 23 | −103.664 | 1.30 | 1.81600 | 46.62 | 0.5568 |
| 24 | 84.006 | 3.91 | | | |
| 25 | 73.632 | 2.85 | 1.85478 | 24.80 | 0.6122 |
| 26 | −4292.626 | 44.64 | | | |
| 27 | 81.078 | 6.30 | 1.66565 | 35.64 | 0.5824 |
| 28 | −115.382 | 1.50 | 1.89286 | 20.36 | 0.6393 |
| 29 | 330.497 | 21.01 | | | |
| 30 | −342.026 | 2.20 | 1.92119 | 23.96 | 0.6203 |
| 31 | 183.841 | 5.54 | | | |
| 32 | 100.062 | 4.98 | 1.61293 | 37.00 | 0.5862 |
| 33 | 1575.517 | 40.24 | | | |
| Image plane | ∞ | | | | |

Various data

| | |
|---|---|
| Focal length | 588.00 |
| F-number | 4.12 |
| Field angle | 2.11 |
| Image height | 21.64 |
| Overall lens length | 465.04 |
| BF (Sk) | 40.24 |

Lens unit data

| Unit | Starting surface | Focal length |
|---|---|---|
| 1 | 1 | 232.11 |
| 2 | 15 | −122.83 |
| 3 | 17 | −1999.95 |

The following Table I collectively indicates various values in the optical system according to each of the exemplary embodiments.

TABLE 1

| | First Exemplary Embodiment | Second Exemplary Embodiment | Third Exemplary Embodiment | Fourth Exemplary Embodiment |
|---|---|---|---|---|
| (1) LD/f | 0.970 | 0.807 | 0.817 | 0.791 |
| (2) Sk/fGp | 0.107 | 0.112 | 0.122 | 0.084 |
| (3) fGn/f3 | 0.111 | 0.128 | 0.146 | 0.065 |
| (4) (R2 + R1)/(R2 − R1) | 1.309 | 1.145 | 1.463 | 0.837 |
| (5) f3/f2 | −3.755 | −3.555 | −4.128 | — |
| (6) \|fGp2/fGn\| | 1.819 | 1.479 | 1.373 | 1.344 |
| (7) vdGp2/vdGn | 2.001 | 1.307 | 1.227 | 1.544 |
| (8) f/f1 | 0.261 | 0.272 | 0.261 | 2.533 |
| (9) f2/f1 | 0.061 | 0.059 | 0.059 | — |
| (10) dFI/LD | 0.399 | 0.488 | 0.522 | 0.445 |
| (11) D12/LD | 0.261 | 0.176 | 0.194 | 0.348 |
| (12) Sk/IH | 1.515 | 1.777 | 1.928 | 1.859 |

[Imaging Apparatus]

Figure 9:
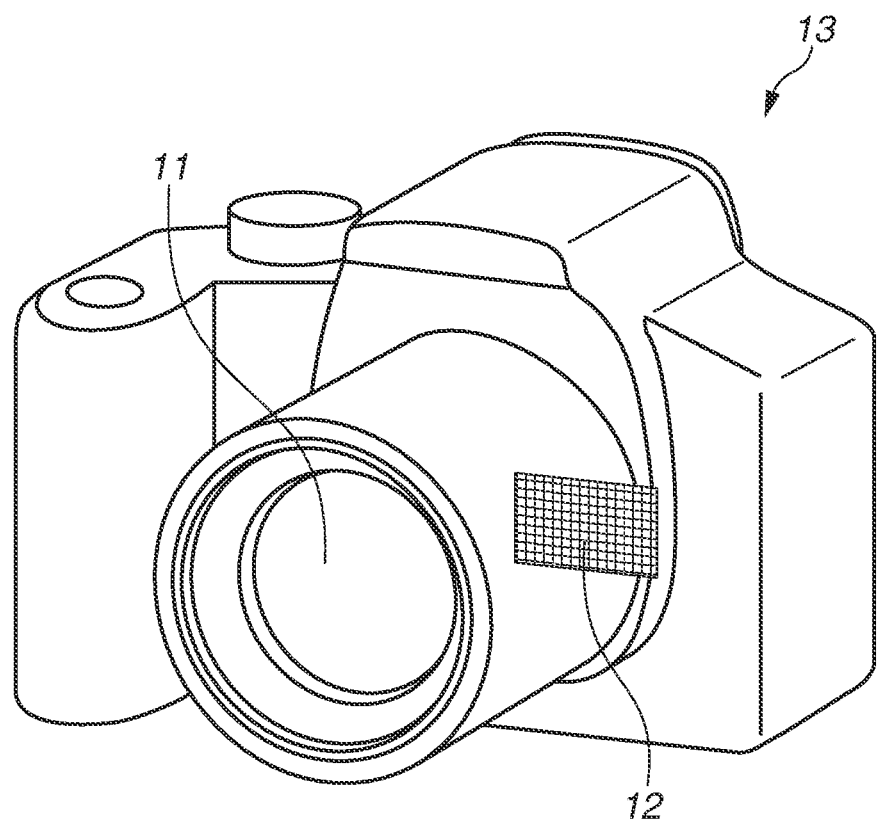
FIG. 9 is a schematic diagram of an imaging apparatus.

Next, an exemplary embodiment of a digital still camera (an imaging apparatus), which uses the optical system according to each of the exemplary embodiments of the present invention as an imaging optical system, will be described with reference to FIG. 9. FIG. 9 illustrates an image capturing optical system 11 and a camera body 13. The image capturing optical system 11 is configured of the optical system according to any one of the first to fourth exemplary embodiments described above. A solid-state imaging element 12 (a photoelectric conversion element) is built in the camera body 13. The solid-state imaging element 12 is an imaging element such as a CCD sensor or a CMOS sensor that receives light of an object image formed by the image capturing optical system 11.

In this way, the optical system according to each of the exemplary embodiments of the present invention may be applied to the imaging apparatus such as a digital still camera. A small imaging apparatus having high optical performance can be thereby obtained.

Some desirable exemplary embodiments and examples of the present invention have been described above, but the present invention is not limited thereto, and allows various combinations, alterations, and modifications within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-230831, filed Nov. 30, 2017, which is hereby incorporated by reference herein in its entirety.

What is claimed is:

1. An optical system comprising:
a first lens unit having positive refractive power, a second lens unit, and a third lens unit having negative refractive power arranged in order from an object side to an image side,
wherein a whole of the second lens unit moves in focusing, thereby changing distances between the first lens unit and the second lens unit and between the second lens unit and the third lens unit,
wherein the third lens unit includes all lenses disposed on the image side of the second lens unit,
wherein the first lens unit includes a positive lens, wherein the third lens unit includes a negative lens, and
wherein the following conditional expressions are satisfied:

$$LD/f<1.000$$

$$0.010<Sk/fGp<0.140$$

$$0.050<fGn/f3<0.155$$

where LD is a distance on an optical axis between a lens surface in the optical system closest to the object side and an image plane, f is a focal length of the optical system, Sk is a back focus of the optical system representing a distance from a lens surface of the optical system closest to the image side to the image plane as an air-converted length, fGp is a focal length of a positive lens Gp being a closest positive lens with respect to the object side in the first lens unit, fGn is a focal length of a negative lens Gn being a closest negative lens with respect to the image side in the third lens unit, and f3 is a focal length of the third lens unit.

2. The optical system according to claim 1, wherein the following conditional expression is satisfied:

$$0.600<(R2+R1)/(R2-R1)<2.000$$

where R1 is a curvature radius of a lens surface on the object side of the positive lens Gp, and R2 is a curvature radius of a lens surface on the image side.

3. The optical system according to claim 1,
wherein the second lens unit has positive refractive power, and
wherein the following conditional expression is satisfied:

$$-5.000<f3/f2<-3.000$$

where f2 is a focal length of the second lens unit.

4. The optical system according to claim 1,
wherein the third lens unit includes a positive lens, and
wherein the negative lens Gn is located next to a positive lens Gp2 at an object side of the positive lens Gp2 being a closest positive lens with respect to the image side in the third lens unit.

5. The optical system according to claim 4, wherein the following conditional expression is satisfied:

$$1.100<|fGp2/fGn|<2.500$$

where fGp2 is a focal length of the positive lens Gp2.

6. The optical system according to claim 4, wherein the following conditional expression is satisfied:

$$1.100<vdGp2/vdGn<3.000$$

where vdGp2 is an Abbe number of the positive lens Gp2, and vdGn is an Abbe number of the negative lens Gn.

7. The optical system according to claim 1, wherein the following conditional expression is satisfied:

$$0.050<f/f1<0.700$$

where f1 is a focal length of the first lens unit.

8. The optical system according to claim 1,
wherein the second lens unit has positive refractive power, and
wherein the following conditional expression is satisfied:

$$0.010<f2/f1<0.075$$

where f1 is a focal length of the first lens unit, and f2 is a focal length of the second lens unit.

9. The optical system according to claim 1, further comprising an aperture stop located on an object side of the second lens unit, wherein the following conditional expression is satisfied:

$$0.30<dFI/LD<0.55$$

where dFI is a distance from the aperture stop to the image plane.

10. The optical system according to claim 1, wherein the following conditional expression is satisfied:

$$0.160<D12/LD<0.400$$

where D12 is a distance on the optical axis between a lens surface at an image side of a lens of the first lens unit located closest to the object side and a lens surface next to the lens surface at the image side.

11. The optical system according to claim 1, wherein the third lens unit has a cemented lens including a positive lens and a negative lens cemented to each other, the cemented lens being located closest to an object side of the third lens unit.

12. The optical system according to claim 1, wherein the positive lens Gp is located closest to the object side in the first lens unit.

13. The optical system according to claim 1,
wherein the third lens unit includes a first sub lens unit having negative refractive power and a second sub lens unit having positive refractive power, and
wherein the first sub lens unit moves in a direction including a component perpendicular to the optical axis in image stabilization.

14. The optical system according to claim 1, wherein the following conditional expression is satisfied:

$$0.050<Sk/fGp<0.140.$$

15. The optical system according to claim 1, wherein the following conditional expression is satisfied:

$$0.060<fGn/f3<0.152.$$

16. An imaging apparatus comprising:
an optical system and an imaging element configured to receive light of an image formed by the optical system,
wherein the optical system includes a first lens unit having positive refractive power, a second lens unit, and a third lens unit having negative refractive power arranged in order from an object side to an image side,
wherein a whole of the second lens unit moves in focusing, thereby changing distances between first lens unit and the second lens unit and between the second lens unit and the third lens unit,
wherein the third lens unit includes all lenses disposed on the image side of the second lens unit,
wherein the first lens unit includes a positive lens,
wherein the third lens unit includes a negative lens, and
wherein the following conditional expressions are satisfied:

$$LD/f<1.000$$

$$0.010<Sk/fGp<0.140$$

$$0.050<fGn/f3<0.155$$

where LD is a distance on an optical axis between a lens surface in the optical system closest to the object side and an image plane, f is a focal length of the optical system, Sk is a back focus of the optical system representing a distance from a lens surface of the optical system closest to the image side to the image plane as an air-converted length, fGp is a focal length of a positive lens Gp being a closest lens with respect the object side in the first lens unit, fGn is a focal length of a negative lens Gn being a closest lens with respect to the image side in the third lens unit.

17. The imaging apparatus according to claim 16, wherein the following conditional expression is satisfied:

$$0.050 < Sk/IH < 2.200$$

where IH is a maximum image height in the imaging apparatus.

18. An optical system comprising:
 a first lens unit having positive refractive power, a second lens unit, and a third lens unit having negative refractive power arranged in order from an object side to an image side,
 wherein a whole of the second lens unit moves in focusing, thereby changing distances between the first lens unit and the second lens unit and between the second lens unit and the third lens unit,
 wherein the third lens unit includes all lenses disposed on the image side of the second lens unit,
 wherein the first lens unit includes a positive lens,
 wherein the third lens unit includes a negative lens, and
 wherein the following conditional expressions are satisfied:

$$LD/f < 1.000$$

$$0.010 < Sk/fGp < 0.170$$

$$0.050 < fGn/f3 < 0.155$$

$$0.600 < (R2+R1)/(R2-R1) < 2.000$$

where LD is a distance on an optical axis between a lens surface in the optical system closest to the object side and an image plane, f is a focal length of the optical system, Sk is a back focus of the optical system representing a distance from a lens surface of the optical system closest to the image side to the image plane as an air-converted length, fGp is a focal length of a positive lens Gp being a closest positive lens with respect to the object side in the first lens unit, fGn is a focal length of a negative lens Gn being a closest negative lens with respect to the image side in the third lens unit, f3 is a focal length of the third lens unit, R1 is a curvature radius of a lens surface on the object side of the positive lens Gp, and R2 is a curvature radius of a lens surface on the image side.

* * * * *